June 23, 1953

L. W. BRYANT 2,643,141

SHAFT SEALING DEVICE FOR PUMPS, COMPRESSORS, AND SIMILAR APPARATUS

Filed Sept. 28, 1950

INVENTOR
Lorton W. Bryant
BY Cameron, Kerkam & Sutton
ATTORNEYS

June 23, 1953
L. W. BRYANT
2,643,141
SHAFT SEALING DEVICE FOR
PUMPS, COMPRESSORS, AND
SIMILAR APPARATUS
Filed Sept. 28, 1950
3 Sheets-Sheet 3
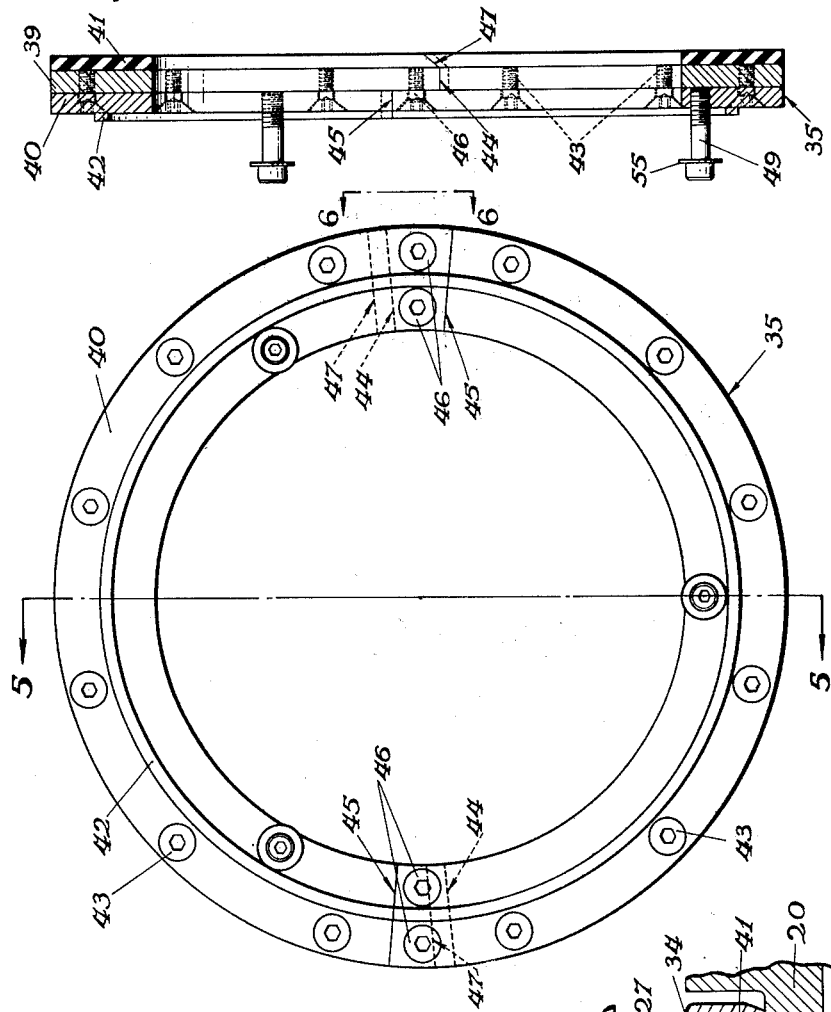
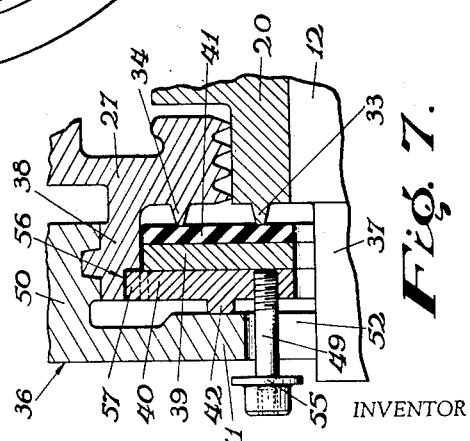
INVENTOR
*Lorton W. Bryant*
BY *Cameron, Kerkam, & Sutton*
ATTORNEYS Patented June 23, 1953

2,643,141

UNITED STATES PATENT OFFICE 2,643,141

SHAFT SEALING DEVICE FOR PUMPS, COMPRESSORS, AND SIMILAR APPARATUS

Lorton W. Bryant, Connersville, Ind., assignor, by mesne assignments, to Dresser Industries, Inc., a corporation of Pennsylvania Application September 28, 1950, Serial No. 187,294

4 Claims. (Cl. 286—11.14)

This invention relates to sealing devices for the shafts of pumps, compressors and similiar apparatus, and is particularly directed to an improvement in the form of stationary shaft and casing seal shown in Owens Patent No. 2,156,161, dated April 25, 1939.

The stationary seal of the Owens patent is especially well adapted for use with gas compressors or boosters of the centrifugal type wherein a liquid seal is employed for preventing leakage of the gas while the device is in operation, and wherein other means must be provided for sealing the shaft with respect to the casing when the shaft is stationary and the running liquid seal is inoperative. The Owens seal embodies a metal sealing disk which is moved into and out of sealing contact with a pair of concentric, annular sealing surfaces formed on the shaft and casing, respectively, by means of a manually operated nut and a separately formed pressure member interposed between the nut and the sealing disk.

While this prior form of seal has proven satisfactory in service in a large number of installations, it requires relatively accurate machining and alignment of the cooperating sealing elements and has a tendency to leak if the sealing surfaces are not properly finished or become worn, or are not lined up as accurately as necessary. Replacement of the sealing disk in the Owens seal also involves some inconvenience in that it is necessary to remove the housing of the shaft bearing in order to get the pressure member and sealing disk off the shaft.

It is therefore the principal object of the present invention to provide a new and improved seal of the type exemplified by Owens Patent No. 2,156,161 which will be more positive in sealing effectiveness, less expensive to manufacture, install and maintain, and easier to replace.

Another object is to provide a novel form of pressure sealing ring for seals of the character described which is also susceptible of use as a replacement for the pressure member and sealing disk of the prior Owens seal.

These and other objects will appear more fully upon consideration of the detailed description of the illustrated embodiments of the invention which follows. In this connection, it is to be expresssly understood that the specific forms of sealing mechanism described and shown in the accompanying drawings are illustrative only and are not to be construed as representing the full scope of the invention, for which latter purpose reference should be had to the appended claims.

Referring now to the drawing, wherein like reference characters indicate like parts throughout the several views:

Fig. 4 is an end elevation, on en enlarged scale, of the pressure sealing ring of Figs. 1–3;

Fig. 5 is a transverse sectional view of the sealing ring taken on line 5—5 in Fig. 4;

Fig. 6 is a fragmentary side elevation of a portion of the sealing ring taken from the line 6—6 in Fig. 4; and Fig. 7 is a fragmentary vertical sectional view of a modified form of the seal shown in Figs. 1–6.

Figure 1:
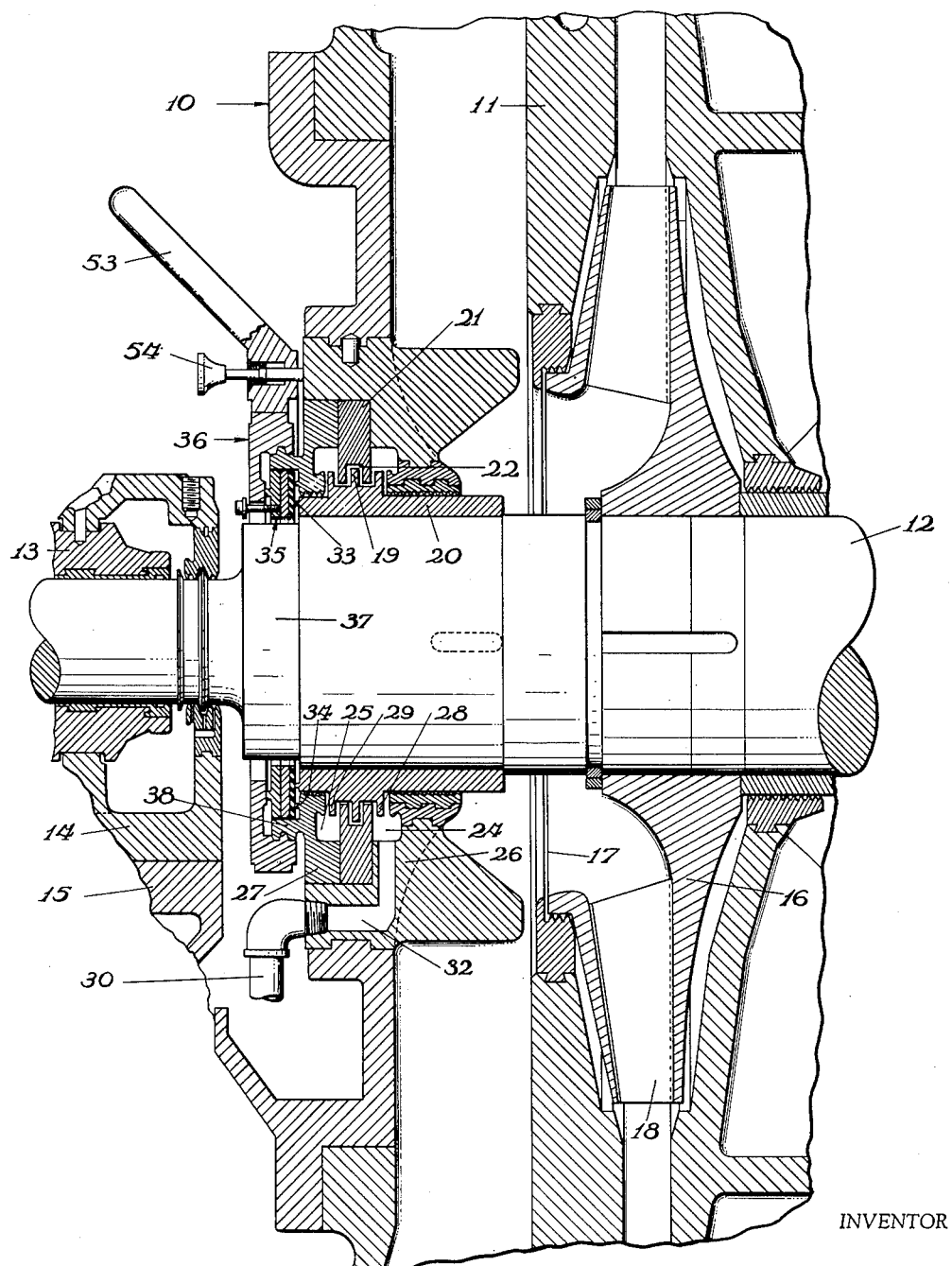
Fig. 1 is a vertical sectional view, with certain parts shown in full, of one end of a multistage gas compressor embodying a stationary shaft and casing seal constructed in accordance with the invention.

In order to exemplify the structure and mode of application of the invention, there is shown in Fig. 1 a portion of one end of a multistage gas compressor fitted with sealing means of generally the same character as that disclosed in the above mentioned Owens patent, but wherein the separate pressure member and metal sealing disk are replaced by a unitary pressure sealing ring of improved construction.

As shown in Fig. 1, the compressor to which the seal is applied has a casing 10, the interior of which is divided into separate compartments for the various compression stages by a series of vertical partitions 11, and a shaft 12 rotatably supported by suitable outboard bearings, one of which is indicated at 13, the housing 14 of the bearing being supported in the usual manner on a platform 15. Mounted on the shaft 12 for rotation therewith are a plurality of centrifugal rotors 16 each having an axial inlet 17 and a peripheral outlet 18, said inlets and outlets being so arranged with respect to the various passages and partitions of the casing 10 that each rotor receives gas from a preceding compartment, compresses it and passes it on at a higher pressure to the next succeeding compartment.

In order to prevent leakage of the gas being handled during operation of the compressor at the points where the shaft 12 passes through the casing 10, each end of the casing is provided with a centrifugal liquid seal which may conveniently employ water as the sealing medium. As shown, the centrifugal seal, which is operative as long as the compressor is running, comprises a rotatable impeller 19 preferably formed integrally with a sleeve 20 fixed to the shaft 12 and an annular impeller housing member 21 fixed to the casing and grooved at its inner periphery to provide a pressure channel 22 into which the impeller 19 extends and wherein it rotates without contact with the surrounding portions of member 21. The sealing liquid is supplied to pressure channel 22 in known manner by a pipe 23 (Fig. 2) and a radial passageway through member 21 (not shown).

Rotation of impeller 19 develops a liquid pressure in channel 22 which is in excess of that of the gas being compressed, and thus forms an effective gas seal. The portions of impeller housing member 21 forming the sides of channel 22 extend inwardly to positions closely adjacent the periphery of sleeve 20 and thereby restrict the flow of sealing liquid from channel 22 along the shaft. Whatever sealing liquid overflows from channel 22 is received in drain channels 24 and 25 located on opposite sides of pressure channel 22 and formed in parts 26 and 27, respectively, both of which are fixed to the casing 10. The trapping in drain channels 24 and 25 of overflow sealing liquid from pressure channel 22 is assisted by slinger rings 28 and 29 which are also preferably formed integrally with sleeve 20 on opposite sides of the channeled portion of impeller housing member 21 and which extend into drain channels 24 and 25 so as to throw the overflow liquid into said channels as they rotate. The liquid in drain channels 24 and 25 may be drained off in any suitable manner, as through pipes 30 and 31 (Fig. 2), pipe 30 being connected to channel 24 by a passageway 32 formed in casing part 26 (Fig. 1), while pipe 31 communicates with channel 25 by a similar passage formed in casing part 27 (not shown).

In order to effectively seal the shaft with respect to the casing when the shaft is stationary and the centrifugal liquid seal is inoperative, stationary sealing means are provided which are so constructed that the parts thereof are held out of contact while the compressor is operating, so as to prevent friction and wear, but can be quickly and easily moved into sealing position when the compressor is shut down. In the embodiment illustrated, the stationary seal comprises an annular axially extending sealing surface 33 associated with the shaft 12, a similar sealing surface 34 associated with the casing 10, a pressure sealing ring indicated generally at 35 which is adapted to be moved into and out of sealing contact with both of sealing surfaces 33 and 34 simultaneously, and a seal operating member 36 which may be manually actuated to move the sealing ring 35 to and from sealing position.

The shaft sealing surface 33 may be conveniently formed as an axially projecting ridge on the outer end of sleeve 20 concentric with shaft 12, the sides of the ridge being slightly tapered, if desired, so as to provide a highly finished metal sealing surface of relatively small radial extent perpendicular to the axis of the shaft. The casing sealing surface 34 is similar in cross section, size and finish to shaft sealing surface 33, and may be conveniently formed as an axial projection integral with casing part 27 and so positioned as to surround shaft sealing surface 33 in concentric, slightly spaced relationship with its finished sealing surface in substantially the same plane as that of shaft sealing surface 33.

The pressure sealing ring 35, which surrounds the reduced portion 37 of shaft 12 projecting outwardly of the casing 10 and has a sliding fit in the recess formed by an outwardly projecting flange 38 on casing part 27, is of the improved composite construction best illustrated in Figs. 4-6. As there shown, the sealing ring consists of a pair of relatively rigid metal rings 39 and 40 of the same external and internal diameters detachably connected to one another in side-by-side relationship, the outer side face of ring 39 having fixed thereto a layer 41 of relatively soft, flexible sealing material, such as rubber, while the outer face of ring 40 is provided with an annular, pressure transmitting ridge 42 projecting outwardly therefrom. The radial width of rings 39 and 40 and facing 41 is sufficiently greater than the spacing between the shaft and casing sealing surfaces 33 and 34 to insure proper sealing engagement between the latter and the facing when the sealing member is moved to sealing position, while ridge 42 is preferably so located as to lie opposite the space between the sealing surfaces 33 and 34 so that substantially equal pressures are applied to the latter by the sealing ring. In the illustrated embodiment, the rings 39 and 40 are made of steel, the pressure transmitting ridge 42 is integral with ring 40 and located centrally thereof, and the flexible facing 41 consists of a layer of rubber suitably bonded to the steel ring 40 and of a thickness approximately half that of the latter.

The metal rings 39 and 40 may be detachably connected to one another in any suitable manner, the preferred construction comprising a plurality of countersunk, socketed, flat head cap screws 43 which pass freely through drilled holes circumferentially spaced in the portion of ring 40 lying outside ridge 42 and are threaded into tapped openings in ring 39. In order to facilitate installation and replacement of the sealing ring without necessitating removal of the outboard bearing 13 or its housing 14, each of rings 39 and 40 is divided diametrically into two pieces, the locations of the splits in said rings being indicated at 44 and 45, respectively. In assembling the rings, the splits 44 and 45 are offset from one another as indicated in Figs. 4-6, so that the ends of the separate pieces of one ring overlap those of the other, and an additional set of countersunk cap screws 46 is provided for securing together the overlapping portions of the ring halves. In the construction illustrated, four such screws 46 are used, two of them lying outside the ridge 42 similarly to screws 43, while the other two are on the opposite side of said ridge. The rubber facing 41 is also severed at the splits 44 in ring 39, as indicated at 47, but, as shown in Figs. 5 and 6, the planes of severance preferably lie at oblique angles of approximately 120° to the plane of the splits 44 for maximum sealing effect. The cuts in the rubber are so made that the overlying portions of the two joints thus formed, one of which is indicated at 48 in Fig. 6, are both connected to the same half of ring 39. With this construction, it is evident that the assembled sealing ring can be separated into two parts and thus readily removed from about the shaft by simply removing the four cap screws 46, without disturbing the screws 43 by which the opposing halves of rings 39 and 40 are connected to one another.

The preferred method of manufacture of the pressure sealing ring involves first cutting out two rings from steel plate having dimensions slightly in excess of those desired for the finished rings 39 and 40, and then machining the side faces, including formation of the ridge 42 on ring 40. The two rings are next individually drilled and tapped to receive the screws 43 and 46 (ring 40 also being additionally tapped to receive the elongated, enlarged head screws 49 hereinafter mentioned), and thereafter cut into halves along the lines 44 and 45. The four half rings are then arranged in the overlapping relationship shown in the drawing and secured together by the screws 43 and 46, after which the inside and outside peripheral edges of the assembled rings are finished to the desired dimensions. The rubber facing 41 is then formed and fixed to the outer side of ring 39 in any desired manner, as by placing the assembled rings in a mold and bonding the rubber to the steel face of ring 39 with the aid of heat and a suitable bonding agent. Finally, the rubber facing is cut as indicated at 47 to complete the assembly.

Figure 3:
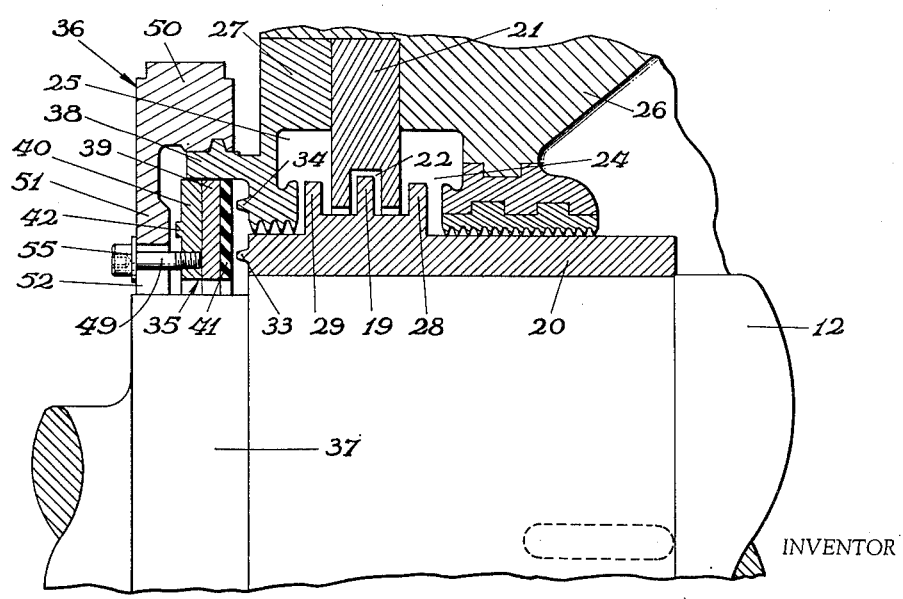
Fig. 3 is a vertical sectional view, on an enlarged scale, taken on line 3—3 in Fig. 2 and showing the pressure sealing ring in retracted or non-sealing position.

As shown in Figs. 1 and 3, there is only a small clearance between the outside periphery of the assembled pressure sealing ring 35 and the inside surface of the recess in flanged portion 38 of casing part 27 so as to provide a sliding fit which maintains the sealing ring concentric with the shaft 12, while the inside diameter of the ring is substantially greater than that of the reduced portion 37 of the shaft which it surrounds in order to avoid any frictional contact therebetween.

Figure 2:
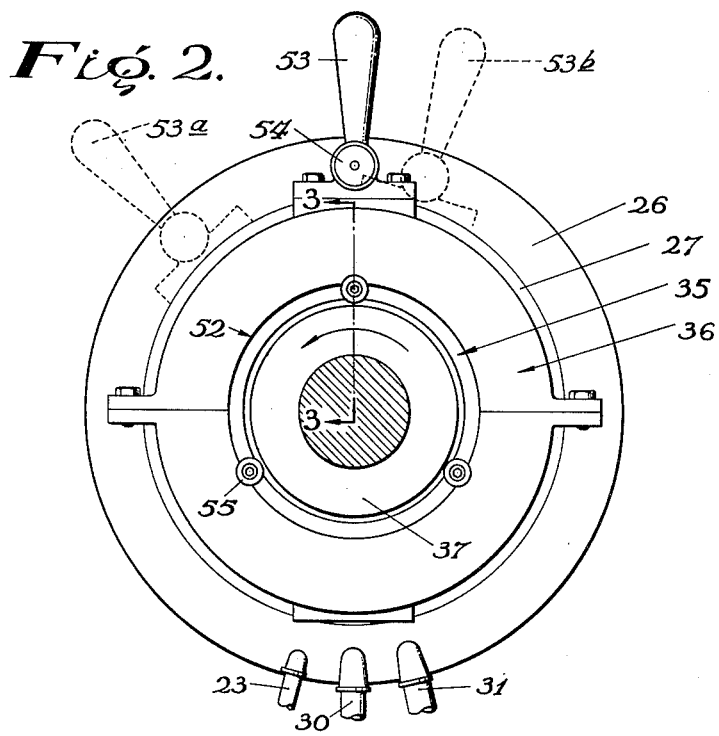
Fig. 2 is an end elevation of the seal of Fig. 1.

Referring now to the mechanism by which the pressure sealing ring 35 is moved into and out of sealing contact with sealing surfaces 33 and 34, it will be seen from Figs. 1–3 that the seal operating member 36 may conveniently take the form of a nut-like element having an internally threaded rim portion 50 which cooperates with an external thread formed on the flange 38 of stationary casing part 27, and an annular wall 51 which extends inwardly from the rim 50 transversely to the axis of shaft 12 and overlies the open end of the recess in flange 38 wherein the sealing ring 35 is housed, the wall 51 having a central opening 52 therein of somewhat greater diameter than the inside diameter of said sealing ring. In order to rotate the operating member 36 so as to move it axially relative to the compressor casing and shaft, it is provided with a suitable handle 53 and a latch 54 carried by the handle which is adapted to cooperate with suitable apertures in the outer face of casing part 26 for maintaining the seal operating member in whichever position is desired. In this connection, it should be noted that the full line position of handle 53 shown in Fig. 2, and its corresponding position in Fig. 1, represents an intermediate position between its normal running position indicated in broken lines at 53a in Fig. 2, wherein the pressure sealing ring 35 is fully retracted out of contact with sealing surfaces 33 and 34 as shown in Fig. 3, and its closed position 53b wherein the sealing ring is in sealing engagement with said surfaces.

Movement of the sealing ring 35 into sealing position is brought about by rotation of the operating member 36 in a clockwise direction as viewed in Fig. 2, the threaded engagement of the rim 50 of said member with the flange 38 of casing part 27 causing the operating member to move axially inwardly, to the right as viewed in Fig. 1, and bringing the wall 51 thereof into abutting engagement with the ridge 42 on the sealing ring. The ridge then transmits the inward thrust of the operating member to the sealing ring and forces the rubber facing 41 of the latter into sealing contact with the sealing surfaces 33 and 34. Due to the softness and flexibility of the rubber facing, it is evident that a completely tight seal will be effected even though the sealing surfaces 33 and 34 may not be entirely true individually or accurately aligned with one another in the same plane perpendicular the axis of the shaft 12.

In order to withdraw the pressure sealing ring 35 from sealing position when it is desired to place the compressor in operation, means are provided forming a lost-motion connection between said ring and the seal operating member 36 such that outward axial movement of the operating member, to the left as viewed in Fig. 1, as the handle 53 is moved from its closed position 53b to running position 53a, will positively disengage the sealing ring from the shaft and casing sealing surfaces 33 and 34. In the embodiment illustrated, the lost-motion connection comprises a plurality of elongated cap screws 49 which are threaded into the ring 40 at suitably spaced points adjacent the inner peripheral edge of said ring, said screws extending axially outwardly through the central opening 52 in the wall 51 of operating member 36 and having at their outer ends enlarged heads 55 of sufficient size to engage the outer surface of the wall 51 in the manner indicated in Fig. 3, wherein the sealing ring is shown in retracted position. The enlarged heads 55 of the screws 49 may conveniently be formed by tack welding washers of suitable diameter to the usual socketed heads of the screws.

With this construction, outward axial movement of operating member 36 upon rotation of handle 53 toward its running position 53a will not produce any movement of sealing ring 35 until the outer surface of wall 51 engages the enlarged heads 55 of screws 49, but thereafter the sealing ring will be positively withdrawn from contact with sealing surfaces 33 and 34 so that there will be no frictional engagement between the shaft sealing surface 33 and the sealing ring when the compressor is running. When the compressor is shut down, the stationary seal may be quickly reestablished by moving the handle 53 to its closed position 53b, whereupon the operating member 36 moves axially inwardly and, upon contact of the wall 51 with ridge 42, transmits pressure to the sealing ring and forces the latter into tight sealing engagement with the sealing surfaces 33 and 34.

It may be desirable in some installations to provide means for positively preventing rotation of the pressure sealing ring 35 about the axis of the shaft as it moves toward and away from sealing position. To this end, a key-and-slot or similar connection may be provided between the sealing ring and the adjacent casing part 27. For example, as shown in Fig. 7, a slot 56 may be formed in the inner surface of flange 38 to receive a cooperating key 57 formed integrally with and extending radially outwardly from ring 40. Such an arrangement, or any of the obvious mechanical equivalents thereof, will effectively maintain the sealing ring in non-rotatable relationship to the casing.

There is thus provided by the present invention a new and improved form of the type of stationary shaft and casing seal disclosed in Owens Patent No. 2,156,161 which is characterized by the incorporation of a unitary pressure sealing ring of unique construction and superior sealing characteristics. The new seal is relatively inexpensive to manufacture, can be installed and replaced with a minimum of labor, and is so designed as to serve as a replacement for prior seals of the Owens type. Although the invention has been described and illustrated herein as applied to a multistage gas compressor, it will be obvious that it is also adaptable to various other forms of pumps and fluid handling apparatus.

While the structures shown in the accompanying drawing are the presently preferred embodiments of the invention, it will be understood that the inventive concept is not limited to the specific devices illustrated, but is capable of a variety of mechanical embodiments. For example, instead of forming the sealing member of two separate metal rings each divided into halves, a single ring might be used having Z type or rabbet joints between the separable halves thereof, in which case the rubber facing 41 and ridge 42 would be formed on opposite sides of the same ring and the only fastening means necessary would be the screws 46 connecting the overlapping ends of the ring halves. It should also be apparent that, for original installations where replacement is not expected, or where the shaft bearing structure would not interfere materially with axial removal of the sealing ring, the latter could be made of an integral piece of metal with the rubber facing bonded to one side and the thrust transmitting ridge on the other side. It will also be evident that the sealing ring or rings may be made of metal other than steel, and that any suitable soft, flexible or resilient material of appropriate gas and liquid impervious characteristics may be used instead of rubber to form the sealing facing.

Various other changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:

1. In a stationary shaft and casing seal of the type embodying concentric annular sealing surfaces on said shaft and casing and a rotatable nut-like member in threaded engagement with said casing having a wall opposed to and adjacent said sealing surfaces, a sealing member adapted to be moved by said nut-like member into and out of sealing contact with said sealing surfaces comprising a pair of metal rings of the same external and internal diameters detachably connected to one another in side-by-side relationship, each of said rings being divided along substantially radial lines into a plurality of pieces detachably connected to one another, the outer side of one of said rings having adherent thereto a non-metallic facing of relatively soft, flexible material adapted to contact said sealing surfaces when the sealing member is moved into sealing position, the outer side of the second ring having an annular ridge projecting outwardly therefrom adapted to contact the wall of said nut-like member and transmit the thrust thereof to said sealing member when said nut-like member is so rotated as to move said sealing member toward sealing position.

2. A sealing member for a stationary shaft and casing seal of the character described comprising a pair of metal rings of the same external and internal diameters detachably connected to one another in side-by-side relationship, a layer of rubber fixed to the outer side face of one of said rings, an annular ridge projecting outwardly from the outer side face of the second ring, said sealing member being divided along substantially radial lines into a plurality of pieces, and means for detachably connecting said pieces together.

3. A sealing member as claimed in claim 2 wherein each of said rings is divided diametrically into two pieces and the rings are detachably connected to one another with the pieces of one ring in overlapping relationship to the pieces of the second ring, the layer of rubber fixed to said first ring also being severed at the points of division between the two pieces of said ring.

4. A sealing member as claimed in claim 3 wherein the planes of severance of said layer of rubber lie at angles to the plane of division between the pieces of said first ring.

LORTON W. BRYANT.

References Cited in the file of this patent

UNITED STATES PATENTS

| Number | Name | Date |
|---|---|---|
| 1,114,238 | Doble | Oct. 20, 1914 |
| 1,521,226 | Bagdanoff | Dec. 30, 1924 |
| 2,089,773 | Vedovell et al. | Aug. 10, 1937 |
| 2,133,304 | Nichols | Oct. 18, 1938 |
| 2,156,161 | Owens | Apr. 25, 1939 |
| 2,404,816 | Snyder | July 30, 1946 |

FOREIGN PATENTS

| Number | Country | Date |
|---|---|---|
| 76,126 | Austria | of 1919 |
| 310,371 | Germany | of 1919 |